United States Patent [19]
Yishay et al.

[11] Patent Number: 5,717,851
[45] Date of Patent: Feb. 10, 1998

[54] BREAKPOINT DETECTION CIRCUIT IN A DATA PROCESSOR AND METHOD THEREFOR

[75] Inventors: Oded Yishay; Joseph Jelemensky, both of Austin, Tex.

[73] Assignee: Motorola, Inc., Schaumburg, Ill.

[21] Appl. No.: 290,667

[22] Filed: Aug. 15, 1994

[51] Int. Cl.$^6$ ........................................... G06F 9/42
[52] U.S. Cl. ..................... 395/183.01; 395/183.11; 395/800; 395/413; 364/267.4
[58] Field of Search ........................ 395/413, 775, 395/650, 500, 375, 183.01, 183.11, 800; 364/267.4

[56] References Cited

U.S. PATENT DOCUMENTS

| | | | |
|---|---|---|---|
| 4,293,950 | 10/1981 | Shimizu et al. | 371/27 |
| 4,338,660 | 7/1982 | Kelley et al. | 395/183.1 |
| 4,635,193 | 1/1987 | Moyer et al. | 395/375 |
| 4,692,897 | 9/1987 | Crabbe, Jr. | 364/900 |
| 4,860,195 | 8/1989 | Krauskopf | 364/200 |
| 5,249,278 | 9/1993 | Krauskopf | 395/413 |
| 5,319,763 | 6/1994 | Ho et al. | 395/775 |
| 5,321,828 | 6/1994 | Phillips et al. | 395/500 |
| 5,367,550 | 11/1994 | Ishida | 377/39 |
| 5,371,894 | 12/1994 | DiBrino | 395/800 |

FOREIGN PATENT DOCUMENTS 0 271 910 A2  12/1987  European Pat. Off. .

OTHER PUBLICATIONS

IBM Technical Disclosure Bulletin, vol. 32, No. 2, published Jul. 1989, pp. 370–371, entitled "Breakpoint Bit Technique for an Address Compare Function."
Motorola, Inc., M68HC16 CPU16 Central Processor Unit–Reference Manual, 1981, pp. 9–13 and 10–6.
Motorola, Inc., M68300 Family CPU32 Central Processor Unit Reference Manual, 1990, pp. 6–10 and 6–11; 7–1 through 7–34.

*Primary Examiner*—William M. Treat
*Assistant Examiner*—Saleh Najjar

[57] ABSTRACT

Existing chip select comparator logic (42) is used to compare a portion of the address value with a range of chip select addresses to provide a match signal for use by both the chip select logic (70) and a breakpoint logic circuit (50.x). The match signal is generated by the chip select logic circuit and is reused by the breakpoint logic circuit to perform a different and distinct function. By using the match signal and a breakpoint enable bit, the breakpoint logic circuit selectively asserts a breakpoint signal. Subsequently, a central processing unit (12) receives the breakpoint signal and initiates a breakpoint exception operation to determine whether the breakpoint condition is met and whether further action should be taken.

7 Claims, 5 Drawing Sheets

5,717,851

1

BREAKPOINT DETECTION CIRCUIT IN A DATA PROCESSOR AND METHOD THEREFOR

FIELD OF THE INVENTION

This invention relates generally to a breakpoint circuit in a data processor, and more particularly to a breakpoint circuit which uses existing control logic in a data processor.

BACKGROUND OF THE INVENTION

When debugging software on a data processing system, it is often necessary to interrupt a program instruction flow in order to examine aspects of the data processing system at particular points during program execution. Such aspects may include examining data, parameters, the instruction execution flow, and internal states. Interrupting the program instruction flow, or "breakpointing" is typically performed by comparing the address of an instruction or data that the a central processing unit (CPU) of the data processing system is about to use with a breakpoint value that may be stored in a breakpoint register. When the address of the instruction or the data that the CPU is about to use is the same as the breakpoint value the program execution is interrupted before or after the instruction is executed or the data is used. The breakpoint value is typically generated off-chip by development system instrumentation, or may also be generated "on-chip" via on-chip breakpoint logic.

On-chip breakpoint logic is often the most desirable method for implementing breakpoint logic. However, because of the size and complexity, on-chip breakpoint logic is usually too costly in silicon area to implement. The added silicon area and corresponding added cost are especially undesirable because the breakpoint function is normally used only during development and not in production of a data processing system.

Another implementation for breakpoint circuitry, external breakpoint logic, does not increase the silicon area required by the data processing system. However, external breakpoint logic does require development system instrumentation to be more complex and more costly because the development system instrumentation must provide a breakpoint control logic circuit. Another disadvantage of external breakpoint logic is that it requires at least one external pin to provide the breakpoint signal to the microcontroller used in the data processing system. This external pin or pins, may consequently increase the cost of the microcontroller.

As explained above, prior art breakpoint implementations use external breakpoint logic or dedicated internal breakpoint detection logic embedded in a silicon data processor implementation. More expensive, high-end data processors incorporate on-chip breakpoint logic within their silicon implementations. Because of their high cost, these data processors are typically not as cost sensitive as high-volume, low-cost microcontrollers. In most high-end data processors, the on-chip breakpoint logic compares signals which provide attributes of bus cycles, address lines, R/$\overline{W}$, and Size to values stored in internal registers. As an example, function codes are signals which provide attributes of bus cycles. If the values provided by the signals which provide attributes of bus cycles, the address lines, R/$\overline{W}$, and size signals matches the values found in the internal registers, breakpoints are asserted synchronously with a bus cycle. The bus cycle can be either an internal bus cycle or an external bus cycle.

Cost sensitive microcontrollers generally do not have on-chip breakpoint logic. These cost sensitive applications utilize external breakpoint logic in development system equipment to perform the breakpoint function. This external breakpoint logic compares address lines, function codes, R/$\overline{W}$ (Read/Write), and size signals, along with other signals which provide timing, to values previously stored by a user in the development system equipment in registers external to the microcontroller. When a match (or other correspondence) is found, breakpoints are asserted synchronously with a bus timing cycle. The bus timing cycle can be either an external bus cycle or an internal bus cycle when these internal timing cycles are visible on the external bus (show cycles). When using low cost microcontrollers such as these in systems which do not have external breakpoint logic, it is difficult to debug the software and the hardware.

Furthermore, when the microcontroller is in a single chip mode of operation, the address terminals or integrated circuit pins, bus control terminals or integrated circuit pins, and data terminals or integrated circuit pins do not provide address, data or control signals. The internal CPU of the microcontroller executes instructions stored in an internal memory of the data processing system. Thus, even if external breakpoint logic is available, the state of the information or data, such as address, function code, Read or $\overline{\text{Write}}$, or size values, transferred on the internal bus during accesses to an internal memory or register is not provided externally to a user. Thus, a breakpoint signal cannot be asserted when required when the microcontroller is in the single chip mode of operation.

Therefore, a need exists for a breakpoint mechanism which efficiently executes a breakpoint operation with a minimum mount of added circuitry both internally and externally.

SUMMARY OF THE INVENTION

The previously mentioned needs are fulfilled with the present invention. Accordingly, there is provided, in a first form, a data processor. The data processor includes a bus interface circuit for communicating a plurality of address signals, a plurality of data signals, and a plurality of control signals. A first comparator is connected to the bus interface circuit for receiving the plurality of address signals. The first comparator compares a first one of the plurality of address signals with a first one of a plurality base address signals to determine if the first one of the plurality of address signals is within a first predetermined range of addresses. The first comparator provides a first match signal if the first one of the plurality of address signals is within the first predetermined range of addresses. A breakpoint circuit is connected to the first comparator for receiving the first match signal. The breakpoint circuit stores a first breakpoint enable value to indicate a breakpoint detection operation should be performed. The breakpoint circuit asserts a breakpoint signal when the first match signal indicates the first one of the plurality of address values is within the first predetermined range of addresses and the first breakpoint enable value indicates the breakpoint detection operation should be performed.

Accordingly, there is provided, in a second form, a method for detecting a breakpoint condition in a data processor. The method includes the steps of communicating a plurality of address signals, a plurality of data signals, and a plurality of control signals using a bus interface circuit. A first one of the plurality of address signals is compared with a first base address value using a comparator. The step of comparing is performed in response to execution of a chip select operation in the data processor. A first match signal is asserted when the first one of the plurality of address signals corresponds to the base address value. A first breakpoint enable value is stored in a breakpoint circuit to indicate a breakpoint detection operation should be performed. A breakpoint signal is asserted when the first match signal is asserted and the first breakpoint enable value indicates the breakpoint detection operation should be performed.

These and other features, and advantages, will be more clearly understood from the following detailed description taken in conjunction with the accompanying drawings. It is important to note the drawings are not intended to represent the only form of the invention.

DETAILED DESCRIPTION OF THE PREFERRED EMBODIMENT

The present invention provides a breakpoint circuit and a method for performing a breakpoint operation which uses logic circuitry embedded on the silicon in a cost effective manner. As was previously described, many microcontrollers have chip select logic embedded in their silicon implementations which compares a portion of the address bus, along with other attributes such as function codes, R/W, and size, to values stored in internal registers, during the appropriate time as indicated by timing signals. The chip select logic provides a match signal, which indicates if the proper address (or range of addresses), along with other attributes as described above, has been matched. Usually, the chip select logic decodes a portion of the address along with other attributes such as those previously mentioned to assert the match signal. This match signal is then driven onto an external integrated circuit pin, with appropriate timing, and is used to select an external device for performing a write operation. Additionally, other operations may also be executed. The solutions and embodiments of the inventions described in the present description use the existing chip select logic, along with minimal new logic, to provide a breakpoint signal. This new and unique use of the chip select logic for performing a breakpoint operation allows a user to posses breakpoint functionality without the typically associated high overhead costs.

The embodiments of the invention described herein do not require external breakpoint logic circuitry. Rather, the embodiments of the invention described herein reuse existing chip select logic circuitry and, therefore, require only minimal dedicated internal logic. Reuse of existing circuitry for another purpose is especially important in low cost data processors because less dedicated logic is required to perform the breakpoint function.

Existing chip select comparator logic is used to decode a portion of the address value along with other attributes such as function codes, R/W, and size. In addition to providing the match signal to the chip select logic as in prior art implementations, the chip select logic also provides a match signal to a breakpoint logic circuit. The breakpoint logic circuit determines whether to assert the breakpoint signal to the central processing unit (CPU) of the data processor or not. Therefore, the match signal is not generated solely for the breakpoint logic; rather, the match signal was already generated by the chip select logic circuit and is reused by the breakpoint logic circuit to perform a different and distinct function. When a breakpoint signal is asserted in response to the match signal, the CPU receives it, and initiates a breakpoint exception operation. Then, a software program may be selectively used to determine whether the breakpoint condition is met, and whether further action should be taken.

Description of Connectivity

Figure 1:
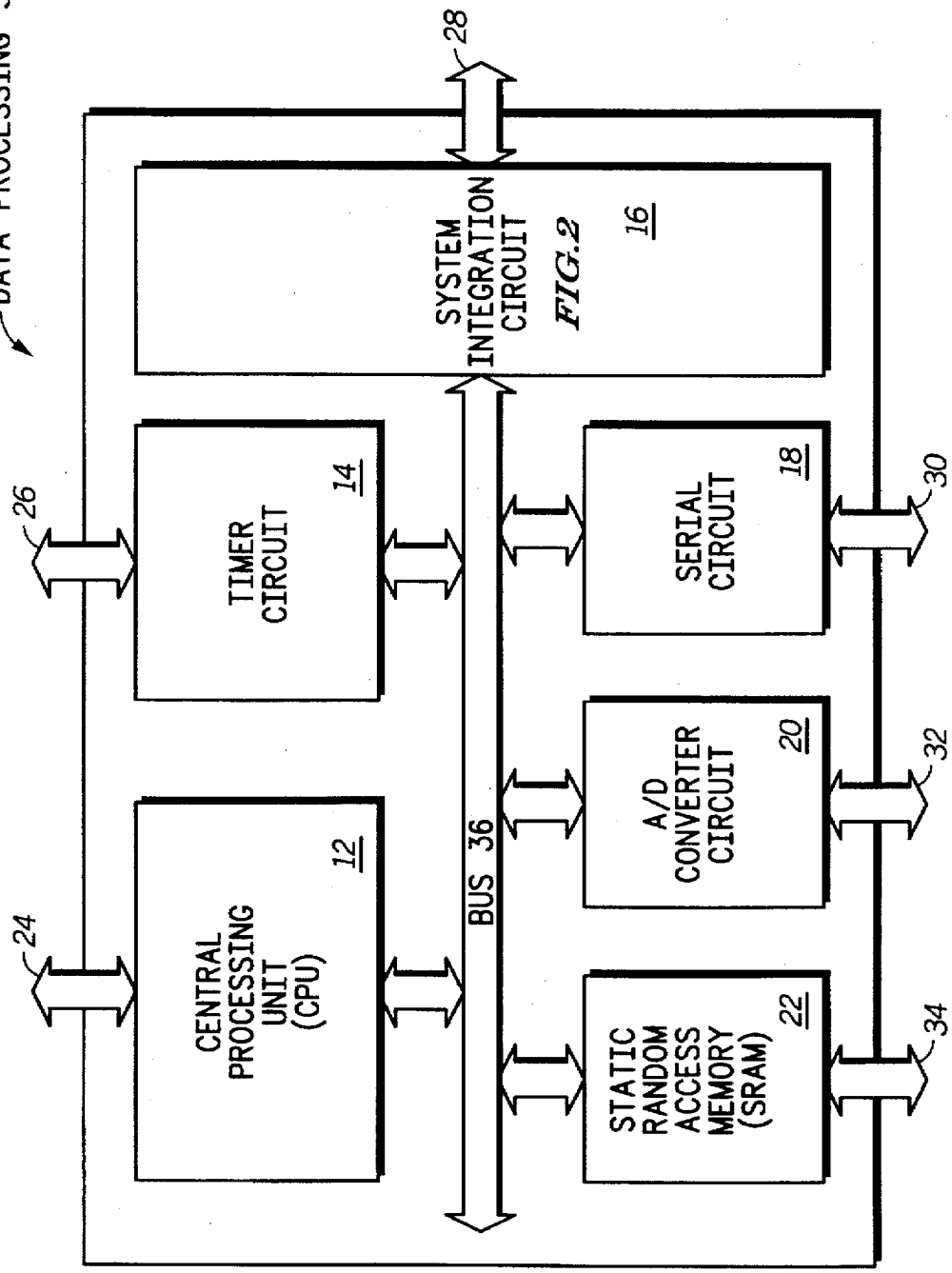
FIG. 1 illustrates a data processing system which implements a breakpoint circuit in accordance with the present invention.

FIG. 1 illustrates a data processing system 10. Data processing system 10 includes a central processing unit, CPU 12, a timer circuit 14, a system integration circuit 16, a serial circuit 18, an A/D converter 20, and a static random access memory (SRAM) 22. Each of CPU 12, timer circuit 14, system integration circuit 16, serial circuit 18, A/D converter 20, and static random access memory (SRAM) 22 is bidirectionally coupled to bus 36.

CPU 12 is coupled to an external device via a plurality of integrated circuit terminals 24. Similarly, timer 14, serial circuit 18, A/D converter 20, and SRAM 22 are coupled to an external device via a respective one of the plurality of integrated circuit terminals 26, 30, 32, and 34.

In one embodiment of the present invention, data processing system 10 is a microcomputer formed on a single integrated circuit. In one embodiment of the invention, integrated circuit terminals 24, 26, 28, 30, 32, and 34 are integrated circuit bonding pads. In another embodiment of the present invention, integrated circuit terminals 24, 26, 28, 30, 32, and 34 are integrated circuit pins.

Figure 2:
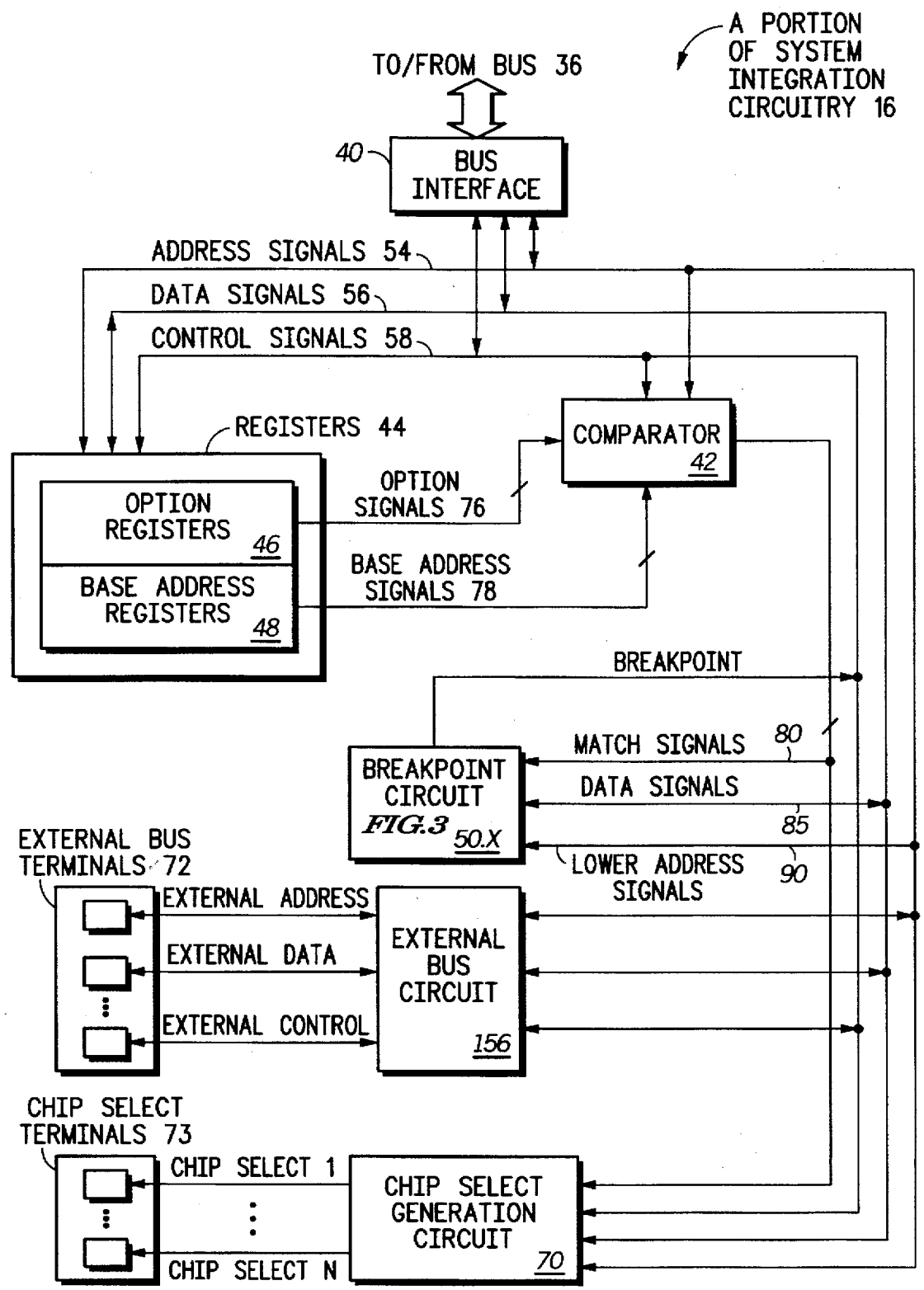
FIG. 2 illustrates a portion of a system integration circuit of the data processing system of FIG. 1.

FIG. 2 illustrates a portion of system integration circuit 16. The portion of system integration circuit 16 includes a bus interface 40, a comparator 42, and a plurality of registers 44. The plurality of registers 44 include a plurality of option registers 46 and a plurality of base address registers 48. The portion of system integration circuit 16 also includes a breakpoint circuit 50.x, a plurality of external bus terminals 72, an external bus circuit 156, a chip select generation circuit 70, and a plurality of chip select terminals 73. Bus 36 is coupled to bus interface 40. Bus interface 40 is coupled to the plurality of registers 44 to provide a plurality of Address signals 54, a plurality of Data signals 56, and a plurality of Control signals 58. Bus interface 40 is coupled to comparator 42 to provide the plurality of Address signals 54 and the plurality of Control signals 58. In the plurality of registers 44, the plurality of options registers 46 is coupled to comparator 42 to provide a plurality of Option signals 76 and the plurality of base address registers is coupled to comparator 42 to provide a plurality of Base Address signals 78. Comparator 42 is coupled to breakpoint circuit 50.x and to chip select generation circuit 70 to provide a plurality of Match signals 80.

Bus interface 40 is coupled to both external bus circuit 156 and chip select generation circuit 70 to provide a plurality of Address signals 54, a plurality of Data signals 56, and a plurality of Control signals 58. Bus interface 40 is coupled to breakpoint circuit 50.x to provide a plurality of Lower Address signals 90 via the plurality of Address signals 54 and to provide a plurality of Data signals 85 via the plurality of Data signals 56. Breakpoint circuit 50.x provides a Breakpoint signal to the plurality of Control signals 58. External bus circuit 156 is coupled to the plurality of external bus terminals 72 for communicating External Address, External Data, and External Control signals. Chip select generation circuit 70 is coupled to the plurality of chip select terminals 73 to provide a plurality of chip select signals, Chip Select 1 through Chip Select N.

Figure 3:
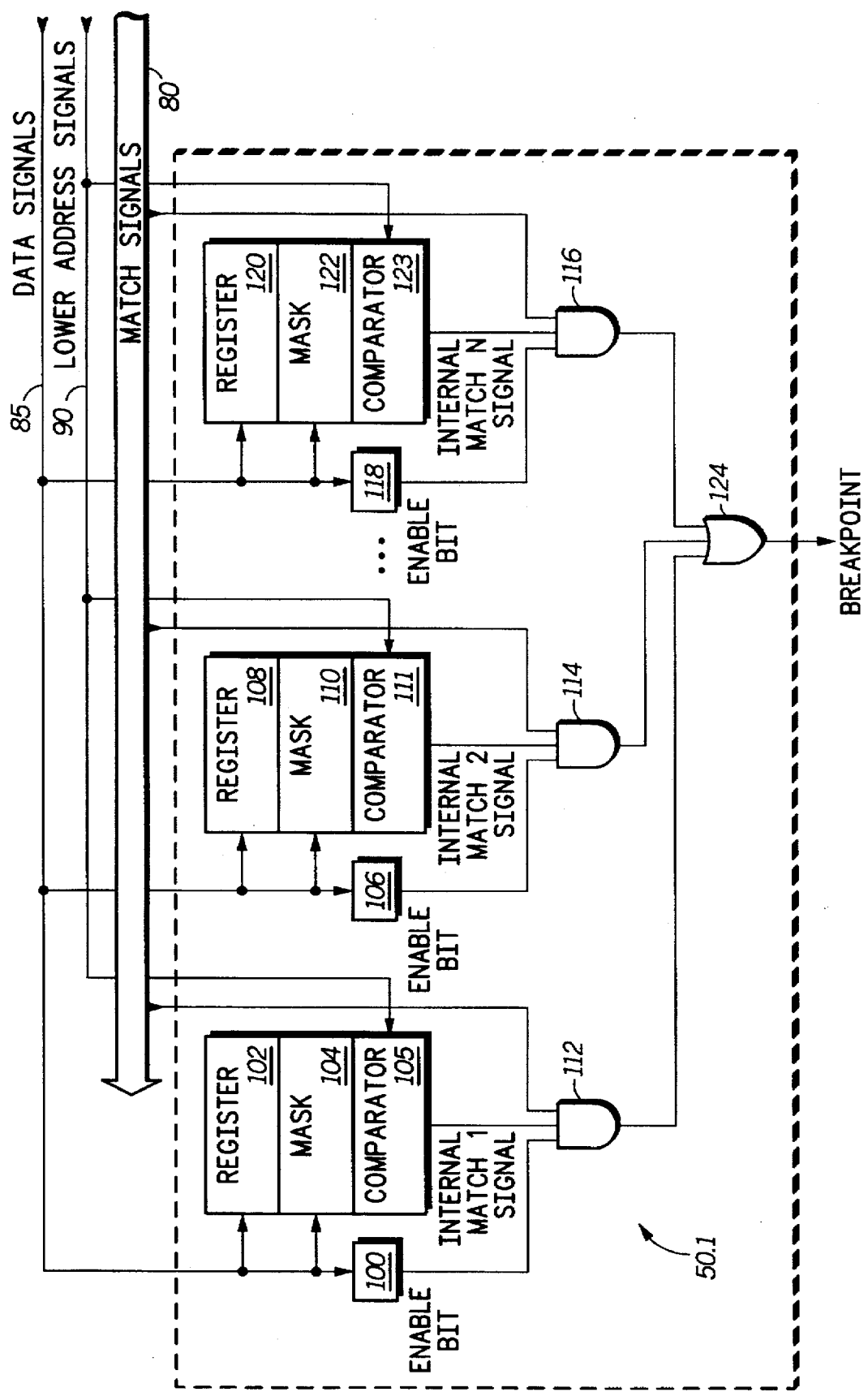
FIG. 3 illustrates a first embodiment of the breakpoint circuit of the system integration circuit of FIG. 2.

FIG. 3 illustrates a first embodiment of the breakpoint circuit 50.1 of the present invention. In this first embodiment, breakpoint circuit 50.1 includes an enable bit 100, a register 102, a mask 104, a comparator 105, an enable bit 106, a register 108, a mask 110, a comparator 111, an AND gate 112, an AND gate 114, an AND gate 116, an enable bit 118, a register 120, a mask 122, a comparator 123, and an OR gate 124. Each of the plurality of Lower Address signals 90 is provided to comparator 105, comparator 111, and comparator 123. Each of the plurality of Data signals 85 is provided to enable bit 100, register 102, mask 104, enable bit 106, register 108, mask 110, enable bit 118, register 120, and a mask 122. Enable bit 100 is coupled to a first input of AND gate 112 and comparator 105 is coupled to a second input of AND gate 112 to provide an Internal Match 1 signal. One of the plurality of Match signals 80 is provided to a third input of AND gate 112. An output of AND gate 112 is provided to a first input of OR gate 124.

Enable bit 106 is coupled to a first input of AND gate 114 and comparator 111 is coupled to a second input of AND gate 114 to provide an Internal Match 2 signal. One of the plurality of Match signals 80 is provided to a third input of AND gate 114. An output of AND gate 114 is provided to a second input of OR gate 124. Enable bit 118 is coupled to a first input of AND gate 116 and comparator 123 is coupled to a second input of AND gate 116 to provide an Internal Match N signal. One of the plurality of Match signals 80 is provided to a third input of AND gate 116. An output of AND gate 116 is provided to a last input of OR gate 124. An output of OR gate 124 provides the Breakpoint signal.

Figure 4:
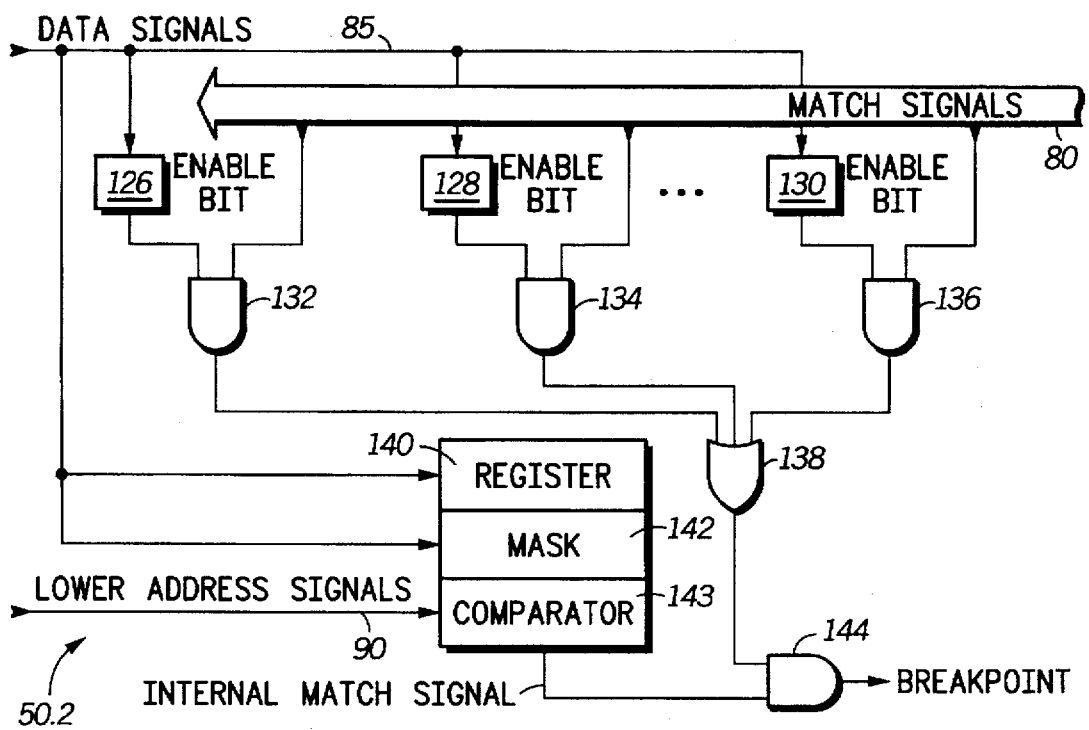
FIG. 4 illustrates a second embodiment of the breakpoint circuit of the system integration circuit of FIG. 2.

FIG. 4 illustrates a second embodiment of the breakpoint circuit 50.2 of the present invention. In this second embodiment, breakpoint circuit 50.2 includes an enable bit 126, an enable bit 128, an enable bit 130, an AND gate 132, an AND gate 134, an AND gate 136, an OR gate 138, a register 140, a mask register 142, a comparator 143, and an AND gate 144. A corresponding one of the plurality of Match signals 80 is respectively provided to a first input of AND gate 132, AND gate 134, and AND gate 136. Enable bit 126 is coupled to a second input of AND gate 132. Enable bit 128 is coupled to a second input of AND gate 134. Enable bit 130 is coupled to a second input of AND gate 136. An output of AND gate 132 is coupled to a first input of OR gate 138, an output of AND gate 134 is coupled to a second input of OR gate 138, and an output of AND gate 136 is coupled to a last input of OR gate 138. An output of OR gate 138 is coupled to a first input of AND gate 144. The plurality of Lower Address signals 90 are provided to comparator 143. Comparator 143 provides an Internal Match signal to a second input of AND gate 144. An output of AND gate 144 is the Breakpoint signal. The plurality of Data signals 85 are provided to enable bit 126, enable bit 128, enable bit 130, register 140, and mask 142.

Figure 5:
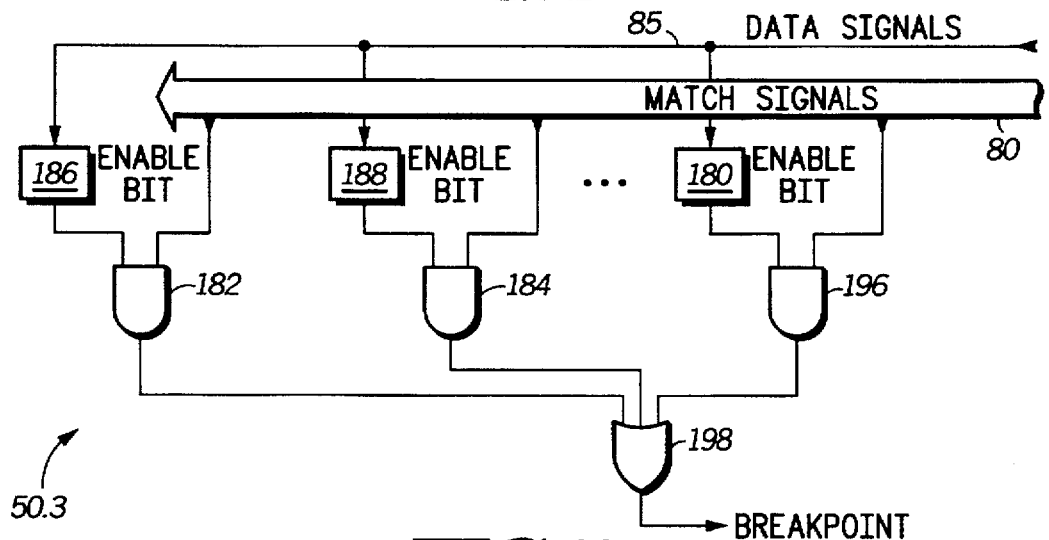
FIG. 5 illustrates a third embodiment of the breakpoint circuit of the system integration circuit of FIG. 2.

FIG. 5 illustrates a third embodiment of the breakpoint circuit 50.3 of the present invention. In this third embodiment, breakpoint circuit 50.3 includes an enable bit 186, an enable bit 188, an enable bit 180, an AND gate 182, an AND gate 184, an AND gate 196, and an OR gate 198. The plurality of Data signals 85 is provided to enable bit 186, enable bit 188, and enable bit 180. A corresponding one of the plurality of Match signals 80 is respectively provided to a first input of AND gate 182, AND gate 184, and AND gate 196. Enable bit 186 is coupled to a second input of AND gate 182. Enable bit 188 is coupled to a second input of AND gate 184. Enable bit 180 is coupled to a second input of AND gate 196. An output of AND gate 182 is coupled to a first input of OR gate 198, an output of AND gate 184 is coupled to a second input of OR gate 198, and an output of AND gate 196 is coupled to a last input of OR gate 198. An output of OR gate 198 is the Breakpoint signal.

Figure 6:
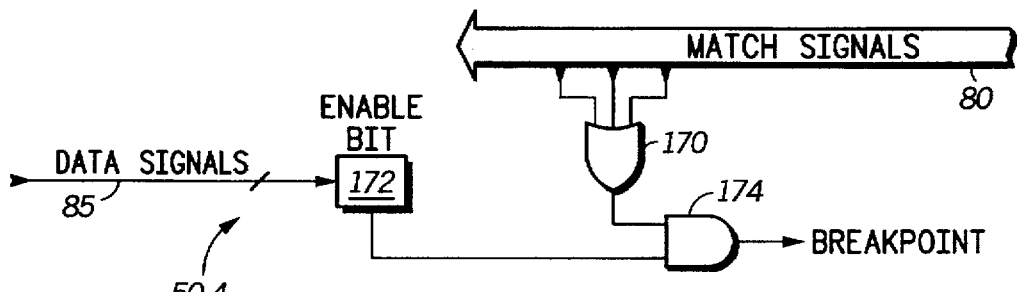
FIG. 6 illustrates a fourth embodiment of the breakpoint circuit of the system integration circuit of FIG. 2.

FIG. 6 illustrates a fourth embodiment of the breakpoint circuit 50.4 of the present invention. In this fourth embodiment, breakpoint circuit 50.4 includes an enable bit 172, an OR gate 170 and an AND gate 174. The plurality of Data signals 85 is provided to enable bit 172. The plurality of Match signals 80 provide a first, a second, and a third input to OR gate 170. An output of OR gate 170 is coupled to a first input of AND gate 174. Enable bit 172 is coupled to a second input of AND gate 174. An output of AND gate 174 is the Breakpoint signal.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. It should also be noted that a d"$" preceding a value indicates that the value is hexadecimal.

Description of Operation

Operation of each of the embodiments of the present invention will now be discussed in more detail. The following are several possible embodiments of the present invention. Each of the embodiments varies in an amount of additional hardware and software required to perform the breakpoint function.

The first embodiment (breakpoint circuit 50.1 of FIG. 3) requires the most additional circuitry and the fourth embodiment (breakpoint circuit 50.4 of FIG. 6) requires the least additional circuitry. The second and third embodiments (breakpoint circuit 50.2 of FIG. 4 and breakpoint circuit 50.3 of FIG. 5, respectively) require intermediate amounts of additional circuitry. Conversely, the first embodiment of the present invention requires no software intervention before further action is taken and the fourth embodiment requires relatively frequent software intervention. Again, the second and third embodiments of the present invention require an amount of software intervention between that of the first and fourth embodiments.

A portion of system integration circuit 16 which includes the breakpoint circuit is illustrated in FIG. 2. Comparator 42 of existing chip select logic in the portion of system integration circuit 16 provides a plurality of Match signals 80 to the breakpoint logic 50.x associated with each of a plurality of chip select channels, Chip Select 1 through Chip Select N, corresponding to the plurality of chip select terminals 73. It should be noted that the plurality of chip select terminals 73 are optionally implemented. Furthermore, the plurality of chip select channels may be associated with a number of chip select terminals 73 which is less than, equal to, or greater than a number of chip select channels. The plurality of Match signals is generated as it typically is in most prior art chip select circuits.

A detailed description of the function and operation of the chip select logic used in the present embodiment of the invention is described in a copending patent application entitled "Integrated Circuit Microprocessor With Programmable Chip Select Logic," invented by James B. Eifert et al., filed Nov. 6, 1989, and expressly incorporated by reference herein.

First Embodiment of the Breakpoint Circuit

In a first embodiment of the breakpoint circuit 50.1 illustrated in FIG. 3, a logic circuitry associated with each of the plurality of chip select channels is required. For each of the plurality of chip select channels, this logic circuitry includes a register for storing a lower address value, a mask register, a comparator, and an enable bit. For a first one of the plurality of chip select channels, the logic circuitry includes register 102, mask register 104, comparator 105, and enable bit 100. For a second one of the plurality of chip select channels, the logic circuitry includes register 108, mask 110, comparator 111, and enable bit 106. Similarly, for a last one of the plurality of chip select channels, the logic circuitry includes register 120, mask 122, comparator 123, and enable bit 118. It should be noted that a remaining portion of the plurality of chip select signals have similar corresponding logic circuitry which is not illustrated in FIG. 3 for the sake of clarity. Furthermore, it should be noted that only one or a plurality of chip select channels may be implemented in an alternate embodiment of the invention.

During operation, breakpoint logic 50.1 compares a lower address value transferred via the plurality of Lower Address signals 90 with a value stored in register 102 using comparator 105. Comparator 105 provides an Internal Match 1 signal indicating a result of the comparison operation. The values stored in register 102, mask register 104, and enable bit 100 were previously set by a user. Concurrently, breakpoint logic 50.1 selectively compares a lower address value transferred via the plurality of Lower Address signals 90 with a value stored in register 108 using comparator 111. Comparator 111 provides an Internal Match 2 signal indicating a result of the comparison operation. The values stored in register 108, mask register 110, and enable bit 106 were previously set by a user. Similarly, breakpoint logic 50.1 concurrently compares a lower address value transferred via the plurality of Lower Address signals 90 with a value stored in register 120 using comparator 123. Comparator 123 provides an Internal Match N signal indicating a result of the comparison operation. The values stored in register 120, mask register 122, and enable bit 118 were previously set by a user. The values stored in each of enable bit 100, register 102, mask register 104, enable bit 106, register 108, mask register 110, enable bit 118, register 120, and mask register 122 are generally provided thereto by the plurality of Data signals 85.

During execution of data processing system 10, only the plurality of lower address values corresponding to registers 102, 108, and 120 are compared with the contents of each of registers 102, 108, and 120. The mask values stored in each of mask registers 104, 110, and 122 are provided to mask bits in each of registers 102, 108, and 120, respectively during the comparison operation. Therefore, when a bit is set to a certain logic state in a mask register, the bit stored in a corresponding register is not used during the comparison operation performed by a corresponding comparator. For example, if a third bit was asserted in mask register 104, the third bit of the lower address value stored in register 102 is not used and is effectively "masked" during a comparison operation performed by comparator 105. Each of the remaining registers, mask registers, and comparators functions in a manner similar to that disclosed herein.

If all compared bits of the address value stored in a register (102, 108, 120) match those provided by the plurality of lower address signals 90, the enable bit (100, 106, 118) is asserted, and an associated one of the plurality of Match signals provided by the comparator 42 (of FIG. 2) is asserted, then the Breakpoint signal associated with a one of the plurality of chip select channels which is asserted is also asserted. For example, comparator 105 asserts the Internal Match 1 signal to indicate that the bits stored in register 102 which remained unmasked by the contents of mask register 104 correspond or match the lower address value provided by the plurality of Lower Address signals 90. When the Internal Match 1 signal is asserted, enable bit 100 is asserted, and a one of the plurality of Match signals corresponding to a first one of the plurality of chip select signals is asserted, the Breakpoint signal is asserted. Similarly, comparator 111 asserts the Internal Match 2 signal to indicate that the bits stored in register 108 which remained unmasked by the contents of mask register 110 correspond or match the lower address value provided by the plurality of Lower Address signals 90. When the Internal Match 2 signal is asserted, enable bit 106 is asserted, and a one of the plurality of Match signals corresponding to a second one of the plurality of chip select signals is asserted, the Breakpoint signal is asserted. Additionally, comparator 123 asserts the Internal Match N signal to indicate that the bits stored in register 120 which remained unmasked by the contents of mask register 122 correspond or match the lower address value provided by the plurality of Lower Address signals 90. When the Internal Match N signal is asserted, enable bit 118 is asserted, and a one of the plurality of Match signals corresponding to a last one of the plurality of chip select signals is asserted, the Breakpoint signal is asserted. If one or more of the signals provided by AND gate 112, AND gate 114, and AND gate 116 is asserted, then a breakpoint condition exists and the Breakpoint signal provided by OR gate 124 is asserted. It should be noted that if the enable bit (100, 106, 118) is negated, the assertion of a corresponding one of the plurality of Match signals from the chip select logic will not assert the breakpoint signals associated with the chip select channel.

When the Breakpoint signal is asserted, the Breakpoint signal is provided to CPU 12 via the bus 36. CPU 12 subsequently initiates a breakpoint exception. In the first embodiment of the invention, no additional software is required to determine whether the breakpoint condition is met. Rather, when the breakpoint condition is met, CPU 12 initiates further action in data processing system 10. Such further action includes a breakpoint exception operation for examining data, parameters, the instruction execution flow, and internal states.

The first embodiment of the invention takes advantage of the comparator's comparison of the upper address values, R/$\overline{W}$, and signals indicating bus cycle attributes during a chip select operation. Therefore, less circuitry is required to implement the breakpoint operation and full functionality is achieved with a smaller breakpoint circuit.

Second Embodiment of the Breakpoint Circuit

In a second embodiment of the breakpoint circuit 50.2 illustrated in FIG. 4, a logic circuit including a register 140, a mask register 142, and a comparator 143 are used to commonly process all breakpoint operations corresponding to each of the plurality of chip select channels. An individual enable bit (126, 128, 130) corresponding to each of the plurality of chip select channels is also provided. A first one of the plurality of chip select channels corresponds to enable bit 126, a second one of the plurality of chip select channels corresponds to enable bit 128, and a last one of the plurality of chip select signals corresponds to enable bit 130. It should be noted that a remaining portion of the plurality of chip select signals have similar enable bits although each is not illustrated in FIG. 4.

During operation, comparator 42 of existing chip select logic in the portion of system integration circuit 16 provides a plurality of Match signals 80 to the breakpoint logic 50.2 associated with each of a plurality of chip select channels, Chip Select 1 through Chip Select N, corresponding to the plurality of chip select terminals 73. As previously described, the plurality of Match signals 80 is generated as it typically is in most prior art chip select circuits.

Each of a portion of the plurality of Match signals 80 is respectively provided to a first input of AND gate 132, AND gate 134, and AND gate 136. If one of the plurality of Match signals corresponding to one of the plurality of chip select channels is asserted and a corresponding enable bit is asserted, then the output of OR gate 138 is also asserted. For example, if a first one of the plurality of Match signals 80 is asserted and enable bit 126 is asserted, an output of AND gate 132 is also asserted. Similarly, if a second one of the plurality of Match signals is asserted and enable bit 128 is asserted, an output of AND gate 134 is also asserted and if a last one of the plurality of Match signals 80 is asserted and enable bit 130 is asserted, an output of AND gate 136 is also asserted. If any one of the outputs of AND gate 132, AND gate 134, and AND gate 136 is asserted, OR gate 138 provides an asserted signal to a first input of AND gate 144.

During operation, breakpoint logic 50.2 compares a lower address value transferred via the plurality of Lower Address signals 90 with a value stored in register 140 using comparator 143. As previously explained, a mask value stored in mask register 142 is provided to mask bits in of the lower address value stored in register 140 during the comparison operation. Therefore, when a bit is set to a certain logic state in mask register 142, a corresponding bit stored in register 140 is not used during the comparison operation performed by comparator 143. For example, if a third bit was asserted in mask register 142, the third bit of the lower address value stored in register 140 is not used and is effectively "masked" during a comparison operation performed by comparator 143. Comparator 143 provides a signal indicating a result of the comparison operation to a second input of AND gate 144. The values stored in register 140, mask register 142, enable bit 126, enable bit 128, and enable bit 130 were previously set by a user. Furthermore, the values stored in register 140, mask register 142, enable bit 126, enable bit 128, and enable bit 130 were previously stored thereto. Generally, the stored values are transferred via the plurality of Data signals 85.

When both inputs to AND gate 144 are asserted, the Breakpoint signal is asserted and is provided to CPU 12 via the bus 36. CPU 12 subsequently initiates a breakpoint exception. In the second embodiment of the invention, only a small amount of additional software is required to determine whether the breakpoint condition is met. Rather, when the breakpoint condition is met, CPU 12 initiates further action in data processing system 10. Such further action includes a breakpoint exception operation for examining data, parameters, the instruction execution flow, and internal states.

Third Embodiment of the Breakpoint Circuit

In a third embodiment of the breakpoint circuit 50.3 illustrated in FIG. 5, a logic circuit including an individual enable bit (186, 188, 180) and a corresponding AND gate (182, 184, 196) is provided. A first one of the plurality of chip select channels corresponds to enable bit 186, a second one of the plurality of chip select channels corresponds to enable bit 188, and a last one of the plurality of chip select signals corresponds to enable bit 180. It should be noted that a remaining portion of the plurality of chip select signals have similar enable bits although each is not illustrated in FIG. 5.

During operation, comparator 42 of existing chip select logic in the portion of system integration circuit 16 provides a plurality of Match signals 80 to the breakpoint logic 50.3 associated with each of a plurality of chip select channels, Chip Select 1 through Chip Select N, received via the plurality of chip select terminals 73. As previously described, the plurality of Match signals 80 is generated as it typically is in most prior art chip select circuits.

The plurality of Match signals 80 are provided to a first input of AND gate 182, AND gate 184, and AND gate 196. If one of the plurality of Match signals 80 corresponding to one of the plurality of chip select channels is asserted and a corresponding enable bit is asserted, then the output of a corresponding AND gate is also asserted. For example, if a first one of the plurality of Match signals 80 is asserted and enable bit 186 is asserted, an output of AND gate 182 is also asserted. Similarly, if a second one of the plurality of Match signals is asserted and enable bit 188 is asserted, an output of AND gate 184 is also asserted and if a last one of the plurality of Match signals is asserted and enable bit 180 is asserted, an output of AND gate 196 is also asserted. If any one of the outputs of AND gate 182, AND gate 184, and AND gate 196 is asserted, OR gate 198 provides an asserted Breakpoint signal. It should be noted that enable bit 186, enable bit 188, and enable bit 180 are set by a user prior to execution of a breakpoint operation. Additionally, it should be noted that the values stored in each of enable bit 186, enable bit 188, and enable bit 180 are generally transferred thereto via the plurality of Data signals 85.

During operation, breakpoint logic 50.3 performs a logical operation on a value stored in an enable bit and a value transferred via a corresponding one of the plurality of Match signals. In the present embodiment of the invention, the logical operation is an AND operation. For example, to determine if the Breakpoint signal which corresponds to a first chip select channel should be generated, enable bit 186 is and'ed with a first one of the plurality of Match signals 80 by AND gate 182. Similarly, to determine if the Breakpoint signal which corresponds to a second chip select channel should be generated, enable bit 188 is and'ed with a second one of the plurality of Match signals 80 by AND gate 184. Additionally, to determine if the Breakpoint signal which corresponds to a last chip select channel should be generated, enable bit 180 is and'ed with a last one of the plurality of Match signals 80 by AND gate 196. Each of AND gate 182, AND gate 184, and AND gate 196 is coupled to OR gate 198 to provide a first input, a second input, and a last input, respectively. When one of the first input, the second input, and the last inputs is asserted, OR gate 198 provides an asserted Breakpoint signal.

The Breakpoint signal is subsequently provided to CPU 12 via bus 36. Upon receipt of an asserted Breakpoint signal, CPU 12 initiates a breakpoint exception. The third embodiment of the invention requires an amount of dedicated hardware which is less than that required by the first and second embodiments of the invention. However, in the third embodiment of the invention, software is required determine whether the breakpoint condition is met. In the third embodiment of the invention, it is likely that the software will be executed more frequently than would be required in the second embodiment of the invention. The software is required to determine if the breakpoint condition has been met because the Breakpoint signal is asserted after only a general determination of correspondence between an address value and a breakpoint value. When the breakpoint condition is met, CPU 12 initiates further action in data processing system 10. Such further action includes a breakpoint exception operation for examining data, parameters, the instruction execution flow, and internal states.

Fourth Embodiment of the Breakpoint Circuit

In a fourth embodiment of the breakpoint circuit 50.4 illustrated in FIG. 4, a single global enable bit 172, an OR gate 170, and an AND gate 174 are provided to initiate the breakpoint function. It should be noted that enable bit 172 is set by a user prior to execution of a breakpoint operation. Additionally, it should be noted that the value stored in each of enable bit 172 is generally transferred thereto via the plurality of Data signals 85.

As previously described, during operation, comparator 42 of existing chip select logic in the portion of system integration circuit 16 provides a plurality of Match signals 80 to the breakpoint logic 50.4 associated with each of a plurality of chip select channels, Chip Select 1 through Chip Select N, corresponding to the plurality of chip select terminals 73. As previously described, the plurality of Match signals is generated as it typically is in most prior art chip select circuits.

The plurality of Match signals 80 are provided to a first, a second, and a last input of OR gate 170. If one of the plurality of Match signals corresponding to one of the plurality of chip select channels is asserted and the enable bit is asserted, then the output of AND gate 174 is also asserted. For example, if a first one of the plurality of Match signals is asserted, OR gate 170 provides an asserted signal to an input of AND gate 174. If enable bit 172 is also asserted and is provided to a second input of AND gate 174, AND gate 174 outputs an asserted Breakpoint signal.

The Breakpoint signal is subsequently provided to CPU 12 via bus 36. Upon receipt of an asserted Breakpoint signal, CPU 12 initiates a breakpoint exception. In the fourth embodiment of the invention, software is required determine whether the breakpoint condition is met. The fourth embodiment of the invention requires an amount of dedicated hardware which is less than that required by the third embodiment of the invention. However, in the fourth embodiment of the invention, software is required to determine whether the breakpoint condition is met. In the fourth embodiment of the invention, it is likely that the software will be executed more frequently than would be required in the third embodiment of the invention. The software is required to determine if the breakpoint condition has been met because the Breakpoint signal is asserted after only a general determination of correspondence between an address value and a breakpoint value. When the breakpoint condition is met, CPU 12 initiates further action in data processing system 10. Such further action includes a breakpoint exception operation for examining data, parameters, the instruction execution flow, and internal states.

Figure 7:
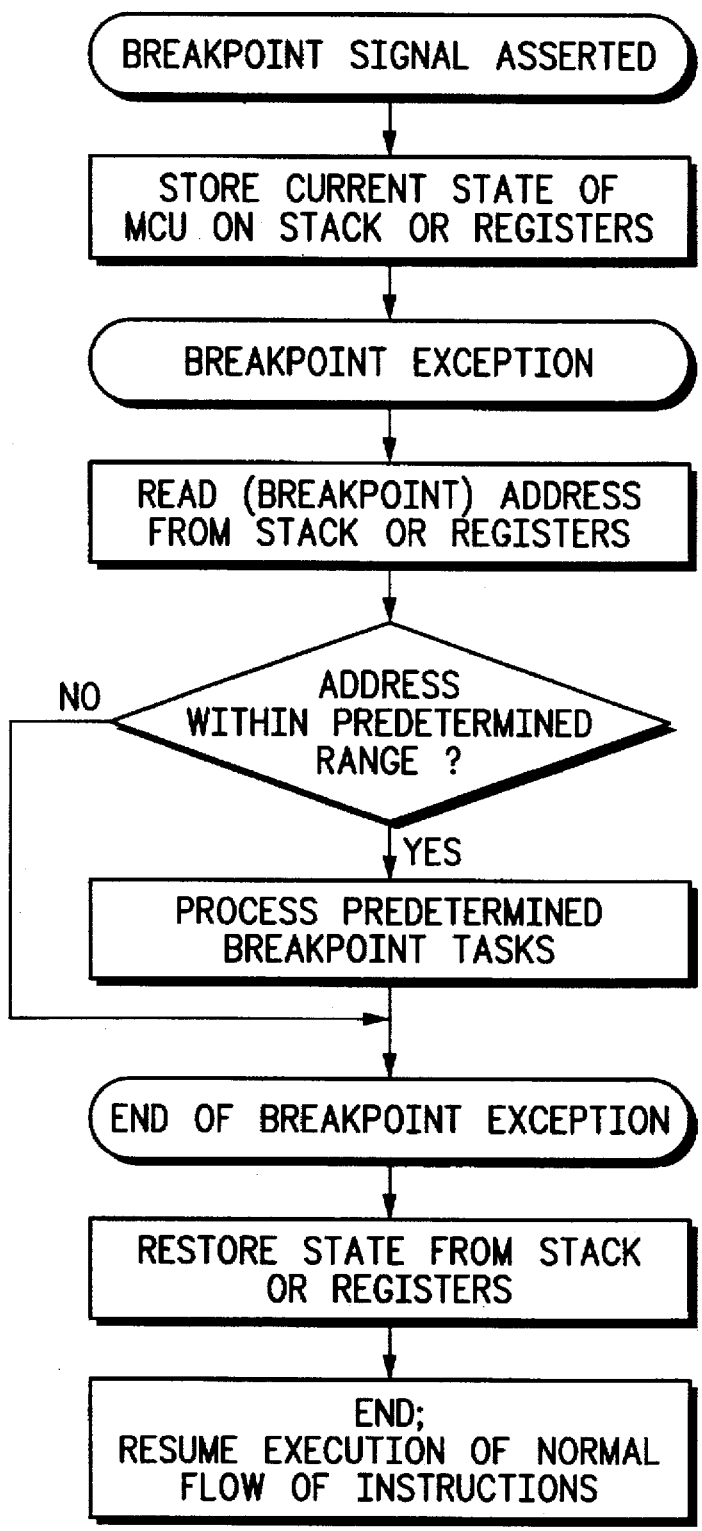
FIG. 7 illustrates in flow chart form a method for executing a breakpoint exception operation in the data processing system of FIG. 1.

FIG. 7 illustrates a generic flow chart describing a possible series of operations which occur after a Breakpoint signal is asserted for each of the embodiments of the invention described herein. When the Breakpoint signal is asserted, CPU 12 initiates exception processing. The following steps may be executed either by software or hardware, or combination of both.

When the Breakpoint signal is asserted, CPU 12 suspends a normal flow of instruction execution, stores a current state in a stack memory or registers, and starts execution of a breakpoint exception handler. The current state includes an address that was currently being transferred on the plurality of Address signals 54 when the Breakpoint signal was asserted. CPU 12 then reads the address corresponding to the current state which was transferred on the plurality of Address signals 54 when the Breakpoint signal is asserted from the stack or register.

The address is then tested to determine whether or not the address was within a target range of addresses to determine if a target breakpoint actually occurred. A target breakpoint is a breakpoint value desired by a user. If the address is not within the predetermined target range of addresses, CPU 12 completes the breakpoint exception operation, restores the state previously stored in the stack memory or register, and resumes execution of the normal flow of instruction execution.

If the address is within the predetermined range, the target breakpoint occurred. CPU 12 continues with the breakpoint exception until it completes all predetermined tasks. Then, CPU 12 completes the breakpoint exception operation, restores the state previously stored on the stack or register, and resumes the normal flow of instructions execution.

SUMMARY OF DETAILED DESCRIPTION OF OPERATION

The present invention provides a cost effective, on-chip breakpoint generation logic embedded within a silicon integrated circuit. As was previously described, existing chip select logic, including chip select generation circuit 70 and comparator 42, provides a match signal which indicates if the proper address or range of addresses, along with other attributes, has been matched. Typically during a chip select operation in which the chip select logic is used, the existing chip select logic decodes a portion of the address along with other attributes such as function codes, R/$\overline{W}$, and size to assert one of the plurality of Match signals. This one of the plurality of Match signals is usually driven onto an external pin, such as one of the plurality of Chip Select terminals 73, using appropriate timing. This one of the plurality of Match signals is typically used externally to data processing system 10 to select an external device for performing a read operation or a write operation. The embodiments of the present invention described herein make use of this existing logic, along with minimal new logic to provide a breakpoint signal. Therefore, a user may use the existing chip select logic (42, 44) to identify if an address value is in a preselected range for a breakpoint address value.

In data processing system 10, comparator 42 is used to decode a portion of an address value along with other attributes such as function codes, R/$\overline{W}$, and size. In addition to providing a one of the plurality of Match signals to the chip select generation circuit 70 as in prior art implementations, the comparator 42 also provides the one of the plurality of Match signals to breakpoint circuit 50.x. Breakpoint circuit 50.x determines whether the Breakpoint signal should be asserted to CPU 12. The one of the plurality of Match signals is not generated just for use by breakpoint circuit 50.x; the one of the plurality of Match signals was previously generated by chip select generation circuit 70 and is reused by breakpoint circuit 50.x. When the Breakpoint signal is asserted, CPU 12 receives it and initiates a breakpoint exception operation. Then, a software routine may be used to determine whether a breakpoint condition is met and whether further action should be taken.

As an example, assume an address value is transferred via Bus 36 and received in a portion of system integration circuit 16 via bus interface 40 and the plurality of Address signals 54. If the address value is in the preselected range, each of the embodiments of the present invention provides an indicator as to whether the address value is actually the breakpoint value. As was previously mentioned, each of the embodiments varies in an amount of additional hardware and software required to perform the breakpoint function. The first embodiment (breakpoint circuit 50.1 of FIG. 3) requires the most additional circuitry and the fourth embodiment (breakpoint circuit 50.4 of FIG. 6) requires the least additional circuitry. The second and third embodiments (breakpoint circuit 50.2 of FIG. 4 and breakpoint circuit 50.3 of FIG. 5, respectively) require intermediate amounts of additional circuitry. Conversely, the first embodiment of the present invention requires no software intervention before further action is taken and the fourth embodiment requires more frequent software intervention. Again, the second and third embodiments of the present invention require an amount of software intervention between that of the first and fourth embodiments.

For example, in the first embodiment of the invention, chip select generation circuit 70 and comparator 72 determine if an address currently transferred via the plurality of Address signals 54 is within a predetermined range of addresses which is identified by a chip select channel. If the address is within the predetermined range of addresses, one of the plurality of Match signals is asserted. Breakpoint circuit 50.1 subsequently uses the match signal to identify a range of addresses corresponding to the chip select channel and receives a plurality of low address values via the plurality of Low Address signals 90 to identify a specific breakpoint address. Therefore, if the Match signal indicates the address value is within a high order range of addresses, the low address value is the same as a masked value formed by combining a value stored in mask register 104 and the value stored in register 102, and an enable bit is asserted to indicate that a breakpoint operation should be executed, the Breakpoint signal is asserted.

Because the Breakpoint signal is only asserted after the address is verified as the breakpoint address and a user has enabled the option of performing the breakpoint operation through the enable bit, relatively little or no software intervention is required for CPU 12 to begin execution of a breakpoint handling routine.

In the second embodiment of the invention, chip select generation circuit 70 and comparator 72 determine if an address currently transferred via the plurality of Address signals 54 is within a predetermined range of addresses which identifies a chip select channel. If the address is within the predetermined range of addresses, one of the plurality of Match signals is asserted. Breakpoint circuit 50.2 subsequently uses the match signal to identify a range of addresses corresponding to the chip select channel and receives a plurality of low address values via the plurality of Low Address signals 90 to identify a specific breakpoint address. Therefore, if the Match signal indicates that the address is within the range defined for one of the plurality of chip select channels, a corresponding enable bit is asserted, and the low address value is the same as a masked value formed by comparing a value stored in mask register 142 and the value stored in register 140, the Breakpoint signal is asserted.

The second embodiment differs from the first embodiment in that it requires a same mask value and a same breakpoint value to be used for each of the chip select channels. The first embodiment allows as many breakpoint values as chip select channels to be implemented because multiple registers, mask registers, and comparators are implemented. The second embodiment of the present invention implements only one register, one mask register, and one comparator for detecting whether the address is the same as the breakpoint address. In this situation, slightly more software intervention may be required for CPU 12 to begin execution of a breakpoint handling routine than would be required by the first embodiment of the invention.

In the third embodiment of the invention, chip select generation circuit 70 and comparator 72 determine if an address currently transferred via the plurality of Address signals 54 is within a predetermined range of addresses which identifies a chip select channel. If the address is within the predetermined range of addresses, one of the plurality of Match signals is asserted. Breakpoint circuit 50.3 subsequently uses the match signal to identify a range of addresses corresponding to the chip select channel. Therefore, if the one of the plurality of Match signals indicates that the address is within the range defined for a specific one of the plurality of chip select channels and a corresponding enable bit is asserted, the Breakpoint signal is asserted.

The third embodiment differs from the first and second embodiments in that the third embodiment determines if an address is within a range of addresses corresponding to a particular chip select channel. The third embodiment does not determine if the address if the address is an actual breakpoint address. In contrast, the first and second embodiments detect whether the address is the same as the breakpoint address. In this situation, more frequent software intervention may be required for CPU 12 to perform a comparison function to determine if the address is the actual breakpoint address and begin execution of a breakpoint handling routine.

In the fourth embodiment of the invention, chip select generation circuit 70 and comparator 72 determine if an address currently transferred via the plurality of Address signals 54 is within a predetermined range of addresses which identifies a chip select channel. If the address is within the predetermined range of addresses, one of the plurality of Match signals is asserted. Breakpoint circuit 50.4 subsequently uses the one of the plurality of Match signals to identify if a range of addresses corresponding to the chip select channel. If any one of the plurality of Match signals indicates that the address is within the range defined for a specific one of the plurality of chip select channels and a global enable bit is asserted, the Breakpoint signal is asserted.

The fourth embodiment differs from each of the previous embodiments in that the fourth embodiment determines only if an address is within a range of addresses corresponding to any chip select channel. In this embodiment of the invention, more frequent software intervention may be required for CPU 12 to perform a comparison function to determine if the address is the actual breakpoint address and begin execution of a breakpoint handling routine.

One key point to note is that the embodiments of the invention described herein do not require external breakpoint logic. Furthermore, by reusing existing chip select logic, the embodiments of the invention described herein require minimal dedicated internal logic. Reuse is important especially in low cost products because reuse of existing circuitry for another purpose results in less dedicated logic circuitry being required to perform the breakpoint function.

Alternate Embodiments

The implementation of the invention described herein is provided by way of example only. However, many other implementations may exist for executing the function described herein. For example, the Breakpoint signal may be provided directly to CPU 12 and not via bus interface 40 and bus 36. Furthermore, breakpoint circuit 50.x mentioned above may be implemented or embedded in chip select logic within chip select generation circuit 70. As well, the detection and generation of the Breakpoint signal described above may be further qualified by timing signals which provide synchronization to a bus cycle and other activities on the busses within data processing system 10. As another embodiment, the enable bits may be high true or low true depending on an application in which they are implemented. Similarly, the comparator may compare high true or low true values of either low address signals or low values stored in an address register. Additionally, lower address signals may be latched and stored in an internal register before they are used by the comparator. Furthermore, the mask registers described herein may have a bit to indicate whether to compare a corresponding asserted signal with an address register bit where a mask register bit may be high true or low true or to compare the corresponding asserted signal with the address register bit where the mask register has that data decoded. As well, the mask register may be optionally implemented and is not required for all implementations of the invention. Additionally, it should be understood that the logic configuration described herein is not a limitation of the possible circuit configurations. Indeed, other implementations of the logic functions described above are also possible with different logic gates. As a further aside and possible implementation, when CPU 12 executes the breakpoint exception operation, CPU 12 may execute the breakpoint exception operation in a background debug mode, or other debug mode of operation.

Background debug mode is a mode of operation in which CPU 12 suspends a normal flow of instruction execution and receives instructions from an external source via dedicated pins, such as integrated circuit terminals 24. The instructions may perform operations such as reading and writing memory and registers associated with data processing system 10. If CPU 12 enters any debug mode of operation, the breakpoint address "read from the stack or register" (as illustrated in FIG. 7) may be obtained by other methods, such as reading the state of a program counter.

Furthermore, it should be understood that a logic gate combining the plurality of Match signals 80 may be included in the chip select logic and may be reused by the breakpoint circuit in generating the Breakpoint signal. An example of such an embodiment could be generated if OR gate 170 of FIG. 6 was included in chip select logic circuitry. In that case, even less dedicated logic than required for the fourth embodiment of the invention is required to implement the breakpoint operation. Additionally, it should be understood that breakpoint logic is not required to be associated with every chip select channel. Rather, the breakpoint logic may be associated with only selected chip select channels.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processor, comprising:
  a chip select circuit including a bus interface circuit for communicating a plurality of address signals, a plurality of data signals, and a plurality of control signals, and a first comparator coupled to the bus interface circuit for receiving the plurality of address signals, the first comparator comparing a first one of the plurality of address signals with a first base address signal to determine when the first one of the plurality of address signals is within a first chip select range of addresses, the first comparator providing a first match signal if the first one of the plurality of address signals is within the first chip select range of addresses, the chip select circuit asserting a first chip select signal where the first match signal is in a predetermined logic state, the first chip select signal being utilized by the data processor to perform a chip select function, wherein the first comparator compares each of the plurality of address signals with a plurality of base address signals provided thereto to provide a plurality of match signals, the first match signal being a first one of the plurality of match signals; and
  a breakpoint circuit coupled to the first comparator for receiving the first match signal, the breakpoint circuit storing a first breakpoint enable value to indicate a breakpoint detection operation should be performed, the breakpoint circuit asserting a breakpoint signal when the first match signal indicates the first one of the plurality of address values is within the first predetermined range of addresses and the first breakpoint enable value indicates the breakpoint detection operation should be performed, wherein the breakpoint circuit, comprises:
    first logic means for logically combining each of the plurality of match signals to provide a combined match signal, the first logic means being coupled to the first comparator for receiving each of the plurality of match signals; and
    second logic means for logically combining the combined match signal and the first breakpoint enable value to provide the breakpoint signal, the second logic means being coupled to the first logic means for receiving the combined match signal;
    a register for storing a breakpoint value;
    a second comparator coupled to the register for receiving the breakpoint value and coupled to the bus interface circuit for receiving a first portion of the plurality of address signals, the second comparator comparing the breakpoint value with the first portion of the plurality of address signals to provide an internal match signal indicating the breakpoint value corresponds to the first portion of the plurality of address signals; and
    a third logic means for logically combining the breakpoint signal and the internal match signal to provide the breakpoint signal, the third logic means being coupled to the second logic means for receiving the breakpoint signal and being coupled to the second comparator for receiving the internal match signal.

2. The data processor of claim 1 wherein the breakpoint circuit, comprises:
  a first register for storing a plurality of breakpoint enable values, the first breakpoint enable value being a first one of the plurality of breakpoint enable values, the first register being coupled to the bus interface circuit to receive and store the plurality of breakpoint enable values;
  first logic means for logically combining each of the plurality of breakpoint enable values with a corresponding one of the plurality of match signals to provide a plurality of combined match signals to indicate a breakpoint operation should be executed, the first logic means being coupled to the first comparator for receiving the plurality of combined match signals and being coupled to the first register for receiving the plurality of enable values; and second logic means for logically combining the plurality of combined match signals to provide an intermediate signal, the second logic means being coupled to the first logic means for receiving the plurality of combined match signals.

3. The data processor of claim 2 wherein the second comparator compares the masked breakpoint value with the first portion of the plurality of address signals to provide the internal match signal indicating the masked breakpoint value corresponds to the first portion of the plurality of address signals.

4. The data processor of claim 3 wherein the first portion of the plurality of address signals is a low order portion of each of the plurality of address signals.

5. The data processor of claim 1 further comprising an enable register for storing a plurality of breakpoint enable values which selectively enable the data processor to execute a breakpoint function, the enable register being coupled to the bus interface circuit for receiving the plurality of breakpoint enable values, the first breakpoint enable value being a first one of the plurality of breakpoint enable values;

a plurality of breakpoint registers, wherein each of the plurality or breakpoint registers stores one of a plurality of breakpoint values, each of the plurality of breakpoint registers corresponding to one of the plurality of match signals;

a plurality of breakpoint comparators, each of the plurality of breakpoint comparators being coupled to a corresponding one of the plurality of breakpoint registers for receiving a one of the plurality of breakpoint values stored therein and being coupled to the bus interface circuit for receiving a first portion of the plurality of address values, the plurality of breakpoint comparators providing a plurality of internal match signals;

first logic means for providing a plurality of breakpoint signals, the first logic means logically combining each one of the plurality of breakpoint enable values with a corresponding one of the plurality of match signals and a corresponding one of the plurality of internal match signals to provide the plurality of breakpoint signals, the first logic means being coupled to the enable register for receiving the plurality of breakpoint enable values, being coupled to the bus interface circuit for receiving the plurality of match signals, and being coupled to the plurality of breakpoint comparators for receiving the plurality of internal match signals; and second logic means for logically combining the plurality of breakpoint signals to provide the breakpoint signal.

6. The data processor of claim 5 wherein the first logic means comprises a plurality of AND logic gates and the second logic means comprises an OR logic gate.

7. The data processor of claim 1 wherein the breakpoint circuit further comprises:

a mask register for storing a mask value, the mask value being used to mask a preselected portion of the breakpoint value stored in the second register to provide a masked breakpoint value, the mask register being coupled to the second register for receiving the breakpoint value and being coupled to the second comparator for providing the masked breakpoint value.

* * * * *